United States Patent [19]

Ward

[11] 4,076,098

[45] Feb. 28, 1978

[54] LOUDSPEAKER DIAPHRAGM

[75] Inventor: Dennis Charles Ward, Brighton, England

[73] Assignee: B & W Loudspeakers Limited, England

[21] Appl. No.: 666,616

[22] Filed: Mar. 15, 1976

[30] Foreign Application Priority Data

Mar. 15, 1975 United Kingdom .............. 10888/75

[51] Int. Cl.$^2$ ...................... D10K 13/00; H04R 7/00; D06N 3/18
[52] U.S. Cl. .................................. 181/170; 181/166; 181/169; 427/412
[58] Field of Search ............... 181/166, 167, 169, 170; 427/412

[56] References Cited

U.S. PATENT DOCUMENTS

| 1,118,675 | 11/1914 | Owen et al. ........................... 181/170 |
| 2,171,389 | 8/1939 | Cate ..................................... 427/412 |
| 2,549,091 | 4/1951 | Hopkins ............................... 181/169 |
| 3,093,207 | 6/1963 | Bozak ................................... 181/167 |
| 3,627,567 | 12/1971 | Tensho ................................. 427/412 |
| 3,937,905 | 2/1976 | Manger ................................ 181/167 |

*Primary Examiner*—Stephen J. Tomsky
*Attorney, Agent, or Firm*—Arnold S. Weintraub

[57] ABSTRACT

This invention relates to loudspeaker diaphragms and methods of making such diaphragms. It is an object of the invention to improve damping of standing waves formed in a loudspeaker diaphragm. To this end a diaphragm in accordance with the invention is made of textile material impregnated with a stiffening material which does not completely fill the spaces between the threads of the textile material, said spaces being partially filled with damping material. The textile material is preferably a woven glass-fiber fabric or a fabric woven or knitted from an aramid fiber. The stiffening material is preferably a synthetic resin, for example, a phenolic, epoxy or melamine resin and the damping material is preferably a polyvinyl-acetate emulsion or a vinyl resin-based thermoplastic material of the kind used as a cone edge dampener.

10 Claims, 3 Drawing Figures

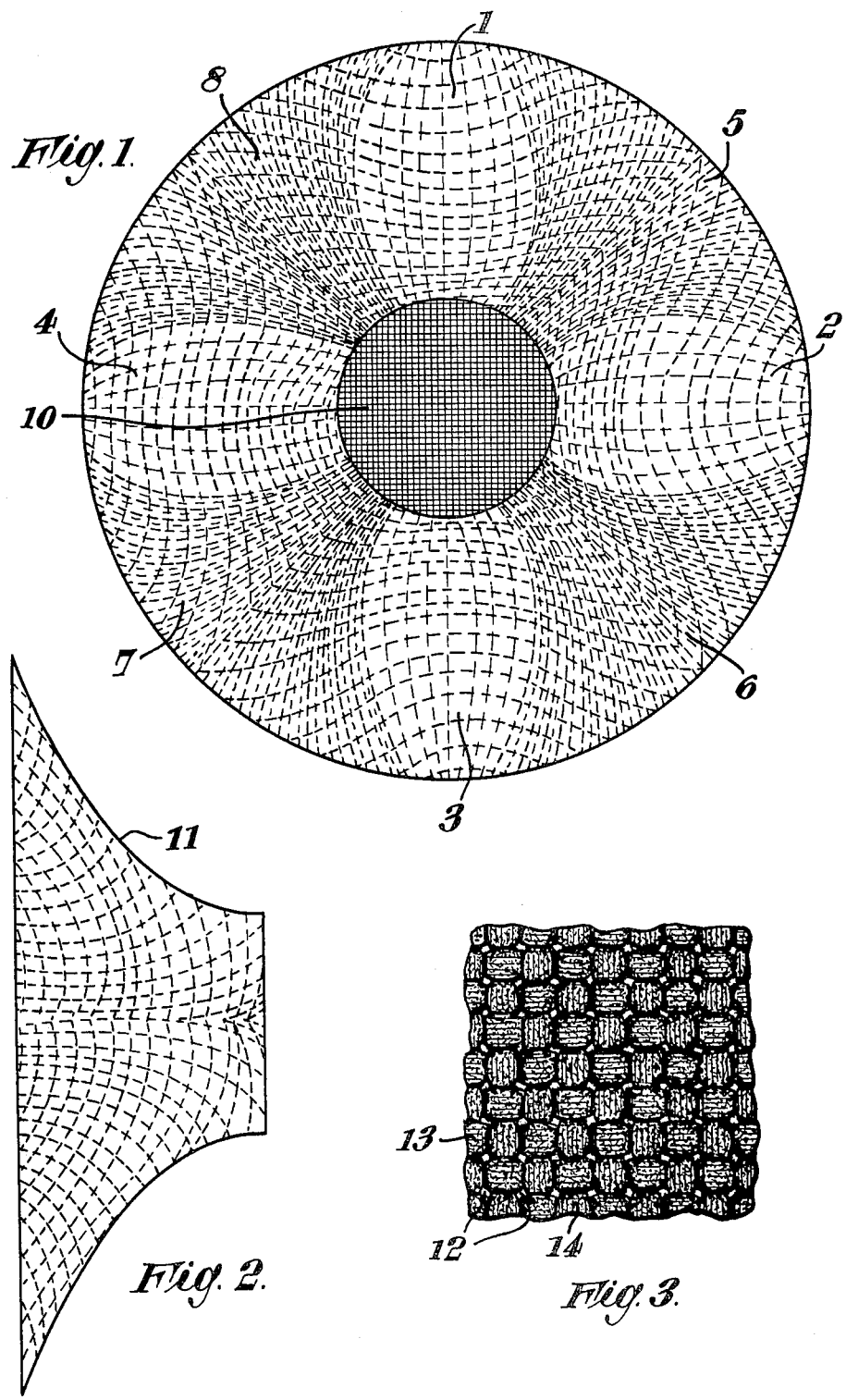

LOUDSPEAKER DIAPHRAGM

The invention relates to loudspeakers and in particular to loudspeaker diaphragms and methods of making such diaphragms.

Most loudspeakers include a diaphragm and a motor for producing movement of the diaphragm to generate sound energy. It is known that distortion of the emitted sound is caused by the storage of energy in the diaphragm and various methods have been adopted in an attempt to reduce this distortion. In particular, it is known that standing waves can be formed in the diaphragm and attempts have been made to damp these waves by coating the the diaphragm with lossy material. Unfortunately, most such lossy materials have relatively poor adhesion to the materials usually used for diaphragms and as a result a coating of lossy material on a known diaphragm does not lead to satisfactory damping of the standing waves.

Accordingly, it is an object of the present invention to construct a loudspeaker diaphragm in such a way that better damping of the standing waves is obtained.

From one aspect the invention consists in a loudspeaker diaphragm made of a textile material impregnated with a stiffening material which does not completely fill the spaces between the threads of the textile material, wherein said spaces are at least partially filled with damping material.

From another aspect, the invention consists in a method of making a loudspeaker diaphragm, wherein a textile material is impregnated with a stiffening material without completely filling the spaces between the threads of the textile material and wherein said spaces are thereafter at least partially filled with damping material.

From yet another aspect, the invention consists in a loudspeaker comprising a diaphragm made of a textile material impregnated with a stiffening material and having spaces between the threads of the textile material at least partially filled with damping material.

The term "textile material" is used herein to include any material formed from threads which are woven, knitted, felted or bonded together to form a fabric having a mesh structure with spaces between adjacent threads. In a preferred embodiment of the invention the textile material used may be a woven glassfibre fabric or may be a fabric woven or knitted from an aramid (aromatic polyamide) fibre.

The stiffening material with which the textile material is impregnated may be a synthetic resin, for example, a phenolic, epoxy of melamine resin. However, any other flexible heat-resistant thermo-setting resin or high-temperature thermo-plastic resin material may be used.

Normally, the fabric used in a diaphragm in accordance with the invention will initially be flexible, both because the fibres from which the material is made are inherently flexible and also because the meshes formed by the weaving or knitting of the material are deformable. The application of the stiffening material is therefore intended to reduce the flexibility of the textile material sufficiently to enable the diaphragm to retain a desired shape while it is being handled. It is preferable to use only the minimum quantity of resin that is necessary to cause the diaphragm to retain its shape. It is to be understood that this shape may be, for example, conical, but in certain types of loudspeaker, a flat or a dome-shaped diaphragm may be used.

The damping material used may be any lossy material, having a high viscosity and high hysteresis that can be sponged or brushed as to the textile material. A suitable material for this purpose is a polyvinyl-acetate emulsion. However, any synthetic resin elastomeric material having high mechanical loss may be used. For example, it has been found that the vinyl resin-based thermoplastic material sold as Cone Edge Dampener E-5525 by the Barrett Varnish Co. is also suitable for this purpose.

One method of performing the invention will now be described with reference to the accompanying diagrammatic drawings, in which:

FIG. 1 is a plan view of a loudspeaker diaphragm in accordance with the invention at one stage during its manufacture, FIG. 2 is a side view of the diaphragm illustrated in FIG. 1, and FIG. 3 is an enlarged view of a portion of a diaphragm at a later stage of manufacture.

In the manufacture of a diaphragm in accordance with the invention, a flat piece of flexible textile material is initially cut roughly to the required shape which may be, for example, circular. The material may be, for example, a fabric woven from the aramid fibre sold by Dupont under the trade mark KEVLAR.

The textile material is then dipped in a solution of thermosetting synthetic resin material, for example, a phenolic, epoxy, or melamine resin. The material is removed from the solution and air-dried until the solvent is evaporated. The material is then inserted in a mould having the desired shape. In the case of a conical diaphragm the mould may have the general shape shown in FIG. 2. The mould is heated to cure the resin, so that, when the diaphragm is removed from the mould, it will retain its shape. In this connection it is important to ensure that the amount of resin used is only just sufficient to enable the diaphragm to be handled without deformation. In particular, it must be ensured that the resin does not completely fill the spaces between the threads of the textile material. As can be seen from FIG. 1, moulding the flat material to its conical shape causes the weave to open out in four areas 1, 2, 3 and 4, and to close up in the intermediate areas 5, 6, 7 and 8.

After the diaphragm has been removed from the mould the periphery is cut accurately to the required shape, so that the diaphragm will have the general appearance illustrated in FIGS. 1 and 2. Thereafter the central portion shown at 10 in FIG. 1 will be cut out by means of a special tool. At this stage assembly of the diaphragm is commenced, for example, by attaching the driving coil and its support and also the surround by means of which the diaphragm is mounted. When this process is partially complete, polyvinylacetate emulsion is brushed on to the exterior surface 11 of the conical part of the diaphragm. This emulsion may be, for example, that sold by the Borden Chemical Company under the trade mark PLASTIFLEX P1200. When this emulsion is dry, assembly of the diaphragm is continued and thereafter a further quantity of the polyvinyl-acetate emulsion is applied to the inner surface of the cone, again by brushing. It is to be understood that, after the two applications of the emulsion, the damping material forms a web across each of the spaces, such as that shown at 12 in FIG. 3 between the threads 13 and 14 of the fabric. This web has good adhesion to the synthetic resin coating on the fibres, but preferably does not completely fill the volume of the spaces bounded by the fibres. In other words, the thickness of the web is preferably less than the thickness of the fibres, so that numerous pockets are formed between the fibres, both on the inner and on the outer surfaces of the diaphragm.

It is to be understood that, because only the minimum amount of synthetic resin is used as stiffening material, it does not completely fill the spaces between the threads of the fabric. As a result, when the polyvinylacetate emulsion is applied, this material enters the spaces between the threads of the fabric and consequently produces good bonding between the damping material and the fabric. It is therefore found that diaphragms produced in accordance with the present invention do not suffer from the disadvantages of diaphragms produced merely by the application of a coating of damping material to the surface of the diaphragm.

What is claimed is:

1. A loudspeaker diaphragm comprising: (a) a textile material having spaces between adjacent threads, (b) an impregnant stiffening material for stiffening the threads and which does not completely fill the spaces between the threads of the textile material, the impregnant comprising a first synthetic resin, and (c) a damping material at least partially filling the spaces, the damping material comprising a second synthetic resin, and wherein said damping material is different from said impregnant.

2. A diaphragm as claimed claim 1, wherein the said textile material is a woven glass fibre fabric.

3. A diaphragm as claimed in claim 1, wherein said textile material is a fabric woven or knitted from an aramid fibre.

4. A diaphragm as claimed in claim 1, wherein the stiffening material is a phenolic, epoxy or melamine resin.

5. A diaphragm as claimed in claim 1, wherein said damping material is a polyvinyl-acetate emulsion.

6. A method for forming a loudspeaker, comprising:
(a) providing a textile material having spaces between adjacent threads,
(b) applying an impregnant to stiffen the textile, the impregnant being applied such that it does not fill up the spaces and comprising a first synthetic resin,
(c) coating the impregnated textile with a damping material to at least partially fill up the spaces, the damping material comprising a second synthetic resin, and
wherein the first synthetic resin is different from the second synthetic resin.

7. A method as claimed in claim 6, wherein said textile material is a woven glass fibre fabric.

8. A method as claimed in claim 6, wherein said textile material is a fabric woven or knitted from an aramid fibre.

9. A method as claimed in claim 6, wherein the stiffening material is a phenolic, epoxy or melamine resin.

10. A method as claimed in claim 6, wherein said damping material is a polyvinyl-acetate emulsion.

* * * * *